United States Patent
Nurmi

(10) Patent No.: US 9,672,332 B2
(45) Date of Patent: Jun. 6, 2017

(54) METHOD AND APPARATUS FOR PREVENTING UNAUTHORIZED USE OF MEDIA ITEMS

(75) Inventor: Mikko Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 992 days.

(21) Appl. No.: 12/708,324

(22) Filed: Feb. 18, 2010

(65) Prior Publication Data

US 2011/0202968 A1  Aug. 18, 2011

(51) Int. Cl.
| | |
|---|---|
| *G06F 21/10* | (2013.01) |
| *G06F 21/00* | (2013.01) |
| G06F 21/60 | (2013.01) |
| G06F 21/35 | (2013.01) |
| G06F 21/31 | (2013.01) |

(52) U.S. Cl.
CPC .............. *G06F 21/10* (2013.01); *G06F 21/00* (2013.01); *G06F 21/31* (2013.01); *G06F 21/35* (2013.01); *G06F 21/60* (2013.01); *G06F 21/602* (2013.01)

(58) Field of Classification Search
CPC .......... G06F 21/00; G06F 21/10; G06F 21/31; G06F 21/35; G06F 21/60; G06F 21/602
USPC .................................................. 726/1–2, 26
See application file for complete search history.

(56) References Cited

U.S. PATENT DOCUMENTS

| | | |
|---|---|---|
| 7,227,567 B1 | 6/2007 | Beck et al. |
| 2004/0162830 A1 | 8/2004 | Shirwadkar et al. |
| 2006/0248584 A1 | 11/2006 | Kelly et al. |
| 2007/0002360 A1 | 1/2007 | Levien et al. |
| 2008/0147641 A1* | 6/2008 | Leffingwell et al. ............ 707/5 |
| 2008/0208868 A1* | 8/2008 | Hubbard ........................ 707/10 |
| 2008/0297586 A1 | 12/2008 | Kurtz et al. |
| 2009/0138930 A1* | 5/2009 | Karaoguz et al. ............ 725/110 |
| 2009/0217344 A1* | 8/2009 | Bellwood et al. ................ 726/1 |
| 2010/0124363 A1 | 5/2010 | Ek et al. |

FOREIGN PATENT DOCUMENTS

WO   WO 2009/145826 A2   12/2009

OTHER PUBLICATIONS

Deng, M. et al. "Personal Rights Management—Taming camera-phones for individual privacy enforcement", Accessed: Apr. 23, 2010, http://petworkshop.org/2006/preproc/preproc_10.pdf.
Gross R. et al. "Information Revelation and Privacy in Online Social Networks (The Facebook case)", Accessed: Apr. 23, 2010, http://www.heinz.cmu.edu/~acquisti/papers/privacy-facebook-gross-acquisti.pdf.
Lipford, et al. Visible Flows: Contextual Integrity and the Design of Privacy Mechanisms on Social Network Sites, Int. Conference on Computational Sci. and Engineering, 2009, pp. 985-989.
Shachtman, N. "New Spy Cam Software Blurs Faces of the Innocent", Jun. 2, 2008. Accessed: Apr. 23, 2010, http://www.wired.com/dangerroom/2008/06/cities-and-corp/.

* cited by examiner

Primary Examiner — Morshed Mehedi
Assistant Examiner — Ayoub Alata
(74) *Attorney, Agent, or Firm* — Ditthavong & Steiner, P.C.

(57) ABSTRACT

An approach is provided for preventing unauthorized use of media items. One or more features associated with a user are identified in one or more media items. It is determined whether the identified features are registered with a privacy service. One or more privacy rules are applied on the media items based on the determination.

18 Claims, 9 Drawing Sheets

METHOD AND APPARATUS FOR PREVENTING UNAUTHORIZED USE OF MEDIA ITEMS

BACKGROUND

Service providers and device manufacturers (e.g., wireless, cellular, etc.) are continually challenged to deliver value and convenience to consumers by, for example, providing compelling network services. One area of interest has been the development of social networking services and/or social media services such as Facebook™ and Flickr™. With these services, users can upload media, such as images, to share with other users. However, as the use of such services becomes more prevalent, the media shared over these services can be widely distributed (e.g., via the Internet). However, the wide distribution of media that captures the likenesses of people can lead to privacy concerns, particularly when pictures capture candid or potentially embarrassing moments. Accordingly, service providers and device manufactures face significant technical challenges in protecting the privacy of users depicted or represented in media shared social networking or other media sharing services.

SOME EXAMPLE EMBODIMENTS

Therefore, there is a need for an approach for preventing unauthorized use or distribution of media content.

According to one embodiment, a method comprises identifying one or more features associated with a user in one or more media items. The method also comprises determining whether the identified features are registered with a privacy service. The method further comprises applying one or more privacy rules on the media items based on the determination.

According to another embodiment, an apparatus comprising at least one processor, and at least one memory including computer program code, the at least one memory and the computer program code configured to, with the at least one processor, cause, at least in part, the apparatus to identify one or more features associated with a user in one or more media items. The apparatus is also caused to determine whether the identified features are registered with a privacy service. The apparatus is further caused to apply one or more privacy rules on the media items based on the determination.

According to another embodiment, a computer-readable storage medium carrying one or more sequences of one or more instructions which, when executed by one or more processors, cause, at least in part, an apparatus to identify one or more features associated with a user in one or more media items. The apparatus is also caused to determine whether the identified features are registered with a privacy service. The apparatus is further caused to apply one or more privacy rules on the media items based on the determination.

According to another embodiment, an apparatus comprises means for identifying one or more features associated with a user in one or more media items. The apparatus also comprises means for determining whether the identified features are registered with a privacy service. The apparatus further comprises means for applying one or more privacy rules on the media items based on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for preventing unauthorized use of media items are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
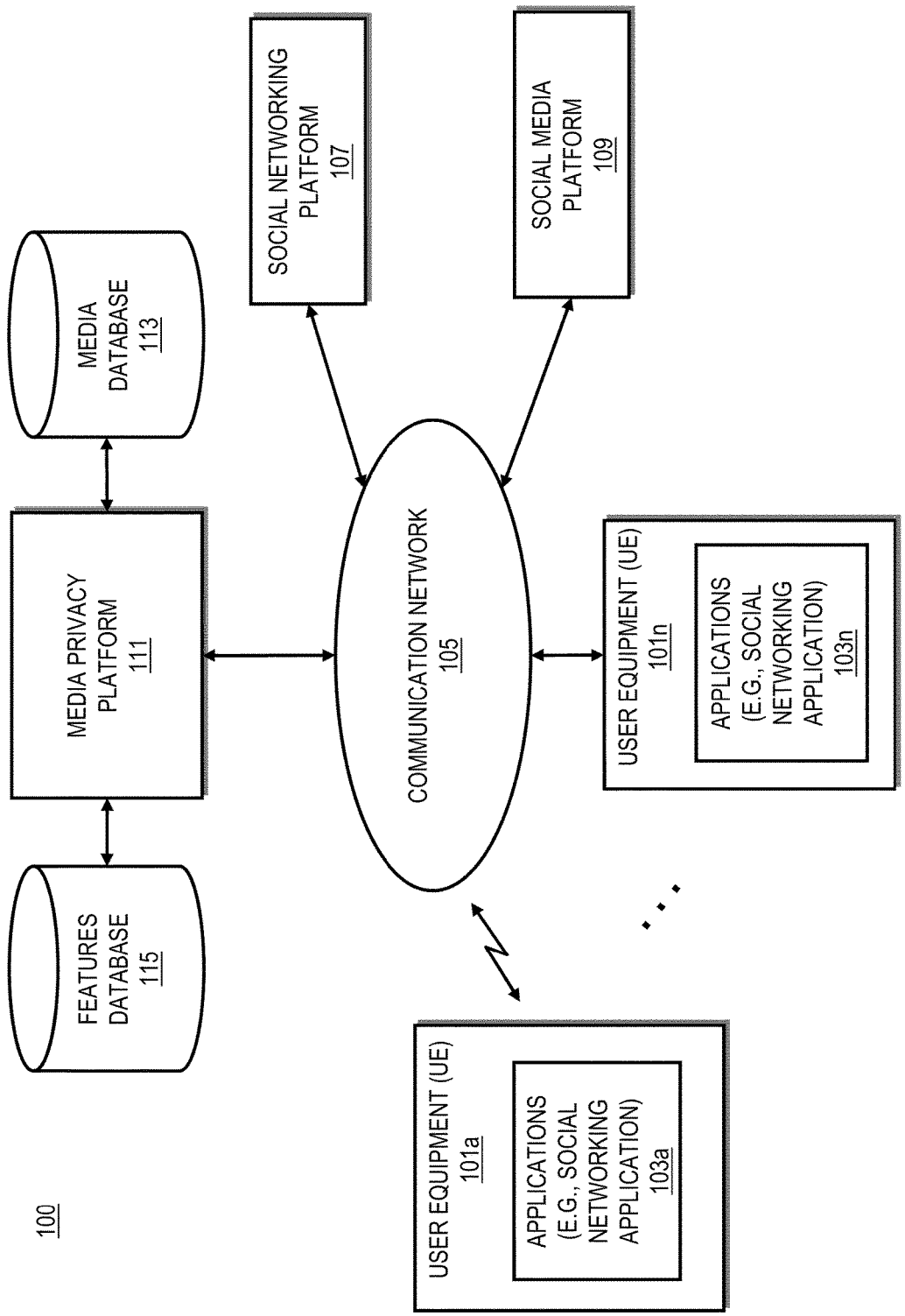
FIG. 1 is a diagram of a system capable of preventing unauthorized use of media items, according to one embodiment.

FIG. 1 is a diagram of a system capable of preventing unauthorized use of media items, according to one embodiment. As noted above, users of network services post media or media items (e.g., photographs, videos, audio files, etc.) for sharing or access by other users. In one embodiment, users may include consumers or any other actor or entity (e.g., a company, organization, group, etc.) that posts media for sharing with others or otherwise publishes media (e.g., Google™ via Google Street View™). In certain embodiments, the term media item is an object (e.g., a digital object) that can be presented to a user. Examples of media items include images, video, audio, etc. Further visual media items may include two-dimensional and/or three-dimensional components. Media items are increasingly uploaded to social service websites and media websites by users of the services. Despite traditional privacy guards (e.g., limiting access to a particular group of friends, tagging photographs, etc.) once uploaded, these media items can often become available on public portions of the websites or on other public websites where the general public and/or other members of the services can access them. These media items may include images of people, distinguishing features (e.g., tattoos, scars, hair style, etc.) as well as inanimate objects (e.g., artwork, buildings, alcohol, cigarettes, and the like).

In many cases, when users post media items, persons captured in the media items may not want or approve of such posting for a variety of reasons (e.g., privacy, unauthorized publication, embarrassment, etc.). For example, posted media items may capture embarrassing images of a person partaking in vices such as smoking or alcohol or even capturing the person performing actions that the person would not want other people to view, such as audio of the person cursing or making disparaging remarks or an image where user is in the same image with another person with whom he doesn't want to be associated with. Moreover, because a person is typically a member of more than one social networking group (e.g., social friends vs. co-workers), a picture that might be appropriated from one group of friends may not be appropriate for another group of friends. For example, in certain social networking services, the person captured in the media item may be associated with friends from college, but the person is additionally associated with co-workers. As such, the person may want privacy from cross-posting media from one group to another. In another case, an artist may have copyrights in the artist's art work. Many people take photographs of such art work. In many cases, artwork (e.g., a portrait) may lose value if the artwork is available outside of a gallery or other place where the artist may charge for it. However, there is a lack of a mechanism to prevent the unauthorized use of images, audio, etc. captured in media items.

To address this problem, a system 100 of FIG. 1 introduces the capability to prevent unauthorized use of media items by identifying one or more features (e.g., facial features, voice features, related objects, identifying marks, artistic representations of such features, artistic images, etc.) associated with a user in one or more media items (e.g., media items posted to a social networking or file sharing service), determining whether the identified features are registered with a privacy service, and then applying one or more privacy rules (e.g., blurring identified features, denying permission to post the media item, alerting the user, etc.) on the media items. In certain embodiments, a feature can be associated with a user by registering the feature and the user with, for instance, a privacy service.

In one example, one or more user equipment (UEs) 101a-101n may be utilized to execute applications 103a-103n (e.g., a social networking application, a web browser, a media application, etc.) to share media items over a communication network 105. These media items, for instance, may be shared via media sharing platforms such as a social networking platform 107 or a social media platform 109 (e.g., file sharing platform). It is noted that although various embodiments are described with respect to social networking platforms 107 and/or the social media platform 109, it is contemplated that the approach described herein may be applicable to any other platform in which media items may be shared and/or otherwise distributed (e.g., web forums, blogs, discussion groups, search engines, etc.). Examples of social networking platforms 107 include social networking websites and services (e.g., Facebook™, Twitter™, MySpace™, etc.). As shown in FIG. 1, a media privacy platform 111 may be utilized by the social networking platform 107 to search through media items to prevent the unauthorized use of media items. That is, the media privacy platform 111 may be provided access to the media items in a media database 113. The media database 113 may be associated with the social networking platform 107, the social media platform 109, and/or the media privacy platform 111. Then, the media privacy platform 111 determines whether any of the media items include a particular feature or set of features that has been previously registered with the media privacy platform 111. In one embodiment, registered features can be stored in a features database 115 for matching or matching, at least in part, against the media items to search. Further, in certain embodiments, the media privacy platform 111 can be a part of the social networking platform 107, social media platform 109, or any other platform for publishing media items. It is also contemplated that the media privacy platform 111, features database 115, media database 113, other sources of related data (e.g., other platforms), and their respective components may be located in a centralized component (e.g., a common server or platform) or distributed in among multiple components, servers, and/or locations in, for instance, a distributed or decentralized manner.

In the approach described herein, a user can initiate the privacy service by registering features to identify with the media privacy platform 111. The user may utilize the social networking application 103, a web browser, or another application of the UE 101 to send examples of the features (e.g., reference images depicting the feature, reference audio samples, etc.) to the media privacy platform 111. According to certain embodiments, features are information associated with media items that can be utilized to identify specific content in a media item. Examples of features include identifiable information about the user, other users, information about an environment, or a combination thereof. Identifiable information about the user (or other users) may include one or more facial images, and/or a three-dimensional depiction of a face, person, etc. that may be utilized to determine a facial model (e.g., a three-dimensional model) of the user to compare with image and/or media items to search for the face. Identifiable information about the user for image and/or video media items may additionally include markings on the user, such as unique tattoos, scars, disfigurations, items uniquely linked to the user (e.g., unique clothing, jewelry), etc. Moreover, identifiable information about the environment in an image and/or video can include trademark information, significant markings on a piece of art, jewelry, clothing, and/or other information uniquely marking an environment. For example, a pattern of a bottle can be linked to the alcoholic beverage beer. Further, a bar in an image may indicate a tavern, club, or bar environment. In a media item that includes a voice, such as a video or audio recording, a user's (or other users') voice can be utilized to generate a voice model. As previously noted, these identifiable features are stored in the features database 115. As noted previously, the features database 115 can be decentralized and/or fully or partially provided on the UE 101.

In one embodiment, multiple features may be specified in any combination to make an identification. For example, a user may register a combination of the user's face along with a beer bottle as the identifiable features to apply a privacy rule or related actions. In this example, the user may specify that any media items (e.g., images or videos) that include the features of the user's face and a beer bottle should automatically be blurred before posting to the social networking platform 107. In yet another embodiment, additional context information may be used to assist identification media items that are subject to the user's privacy rules. This context may include date, time, location, etc. The media privacy platform 111 can then prioritize the media items that it should search for the user's registered features. In this way, the system 100 can advantageously reduce the number of media items that should be searched or should be searched first where the features are likely to be found; thereby reducing the processing resources for identifying the features. In one alternative embodiment, the system 100 can use more resource intensive (e.g., time or processor consuming) but more accurate algorithms on content or media that is more likely to contain searched features, and then use less resource intensive search algorithms for media content that is not likely to contain the searched features.

Further, in another embodiment, the search can be made more efficient by collecting contextual information about the user to narrow or reduce the amount of media content to be scanned. For example, a user can share information about the user's location history with the media privacy platform 111. The system 100 can then narrow down the search to the only the content that is captured in the locations where user was at a given time (e.g., based on location history).

After the media privacy platform 111 identifies media items containing the user's registered features, the user, via the UE 101, may send (e.g., via another platform or directly) the media privacy platform 111 a request to perform one or more particular actions on media items containing the feature(s). These actions may be in the form of rules to invoke on media items found to include the feature(s). The rules may include obscuring features in the media items (e.g., black out or blur a face, tattoo, etc. or modify, such as beep, a vocal feature), requesting approval of the user making the request to publish the media items (e.g., an image of the user), blocking publication of the media items, or removing publication of the media items. These rules may be invoked on media items currently published or on media items as other users attempt to post the media items. Additionally, the user may register with or be registered with the media service platform 111 or the social networking platform 107 as part of the request.

Once the media privacy platform 111 receives the request, the media privacy platform 111 can search a media database 113 for the feature(s). If the media privacy platform 111 identifies one or more of the features, the media privacy platform 111 performs one of the associated rules. In certain embodiments, the media privacy platform 111 only searches a set of the media database 113. In these embodiments, the media privacy platform 111 may select which media items to search based, for instance, on a social graph associated with the user setting the rules. In certain embodiments, a social graph is a data structure or a group of data structures (e.g., list, table, etc.) that stores connection and relationship information between users (e.g., connections via accounts of users or members of a social networking service). For example, groups (e.g., family, friends, colleagues, co-workers, acquaintances, etc.) may be depicted or described as associations within information stored about the user. Further, social graphs can be generated by identifying and linking relationships based on contact information. Social network build-up is generally based upon user driven manual invitations and linking new friends to a user's social graph. Moreover, social graphs can include groupings of people that are not involved with other groups (e.g., a friends group may be unassociated with a people living in Washington, D.C. group). A social graph rule may be utilized to select which media items are searched. For example, the user of media privacy platform 111 may select a rule that media items associated with users associated with the social graph are processed to determine whether the features are present. Additionally or alternatively, when new media items are added, the media privacy platform 111 may determine if the features are present and whether to apply the privacy rules.

In certain embodiments, the selection of media items may additionally be based on contextual information of the user, as previously discussed. For example, some or all of the media items may include metadata that includes location information. Further, the user may provide contextual information associated with the user (e.g., the user was at a particular location at a particular time). If the contextual information of the user matches or matches, at least in part, contextual information associated with a media item, the media item is selected for determining whether the feature is present in the media item. By way of example, the contextual information may be specified by the user, determined by sensors, or retrieved from a service associated with the user (e.g., a calendar service).

The media privacy platform 111 may utilize conventional algorithms (e.g., image or voice processing algorithms) and methods to determine whether the feature is present in the media item. For example, in the case that the feature is a face, a face recognition system may be utilized to automatically identify a person from an image or video frame. As such, selected facial features from the media item can be compared with facial features present in provided facial features images to determine a facial model. Exemplary facial recognition systems may utilize algorithms to extract landmarks or features from a face (e.g., relative size or position of eyes, nose, cheekbones, jaw, etc.) provided to generate a facial model. Particular algorithms that may be utilized include Principal Component Analysis, Hidden Markov model, Linear Discriminate Analysis, Elastic Bunch Matching fisherface, etc. Further, such algorithms and models may be utilized to recognize features such as tattoos and other identifying marks. Examples of other feature recognition include the determination of a person's voice using voice recognition technology.

Once a media item is determined to be associated with a feature, the media privacy platform 111 determines whether a rule is applicable to the media item. The rule is then applied to the media item. For example, a recognized facial feature in an image media item may be obscured using a blur feature or black bar. As such, the media privacy platform 111 can be a means to alter the image media item. In other embodiments, the image media item filters can be provided for the image media item. That is, the actual image media item is unchanged, but the presentation of the image media item to the public is modified.

As shown in FIG. 1, the system 100 comprises the UE 101 having connectivity to the social networking platform 107, the social media platform 109, and the media privacy platform 111 via the communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, social networking platform 107, social media platform 109, and media privacy platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
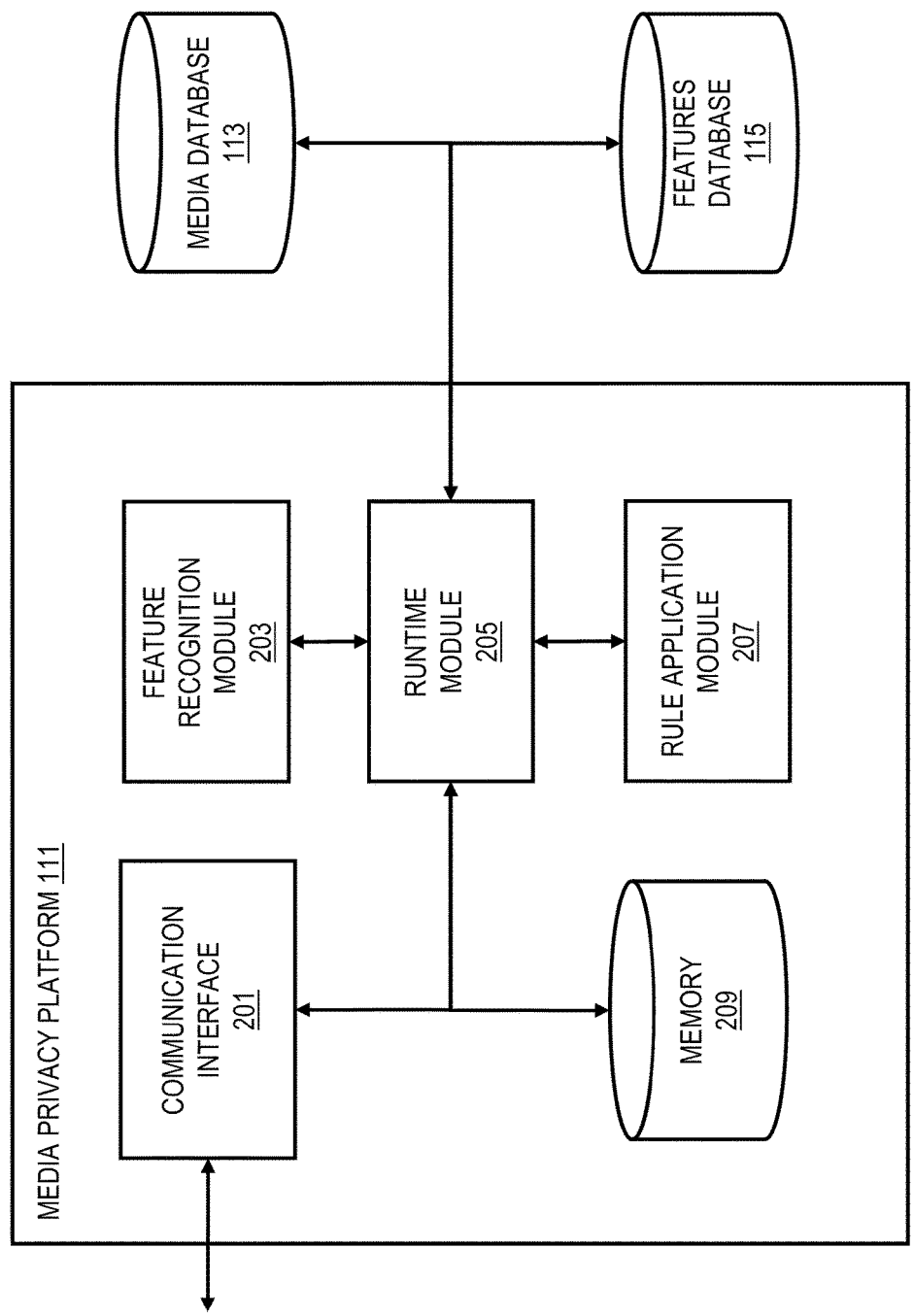
FIG. 2 is a diagram of the components of a media privacy platform, according to one embodiment.

FIG. 2 is a diagram of the components of a media privacy platform capable of performing rules on media items based on whether a feature is identified in the media item, according to one embodiment. By way of example, the media privacy platform 111 includes one or more components for providing media privacy according to rules. It is contemplated that the functions of these components may be combined in one or more components or performed by other components of equivalent functionality. In this embodiment, the media privacy platform 111 includes a communication interface 201, a feature recognition module 203, a runtime module 205 that can execute processes, a rule application module 207 that can be used to apply rules to a media item, and a memory 209. Moreover, it is noted that the media privacy platform 111 may be a component of a social networking platform 107 or a social media platform 109.

The communication interface 201 can be used to communicate with a UE 101. The media privacy platform 111 can receive information from the UE 101 via the communication interface 201 via methods such as internet protocol, MMS, SMS, GPRS, or any other available communication method. The UE 101 can send information to the media privacy platform 111 for many reasons, such as to provide rules and/or features to the media privacy platform 111. Further, the runtime module 205 may utilize the communication interface 201 to receive registration information associated with a user of the media privacy platform 111. As such, the media privacy platform 111 can register the user to perform privacy functions. The user may register with the media privacy platform 111 or at a separate platform (e.g., a social networking platform 107, social media platform 109, etc.). The media privacy platform 111 may additionally be provided the registration information of the separate platform to provide media privacy to the user. As such, the user can log into the media privacy platform 111 via an authentication mechanism (e.g., a user name and password). Further, the communication interface 201 may be utilized to communicate with the separate platform to retrieve other user information such as a social graph.

The runtime module 205 can utilize the communication interface 201 to retrieve features associated with the user (e.g., a set of images associated with the user's face). These features can be stored in the features database 115. Further, these features can be associated with rules. As noted previously, the rules can include obscuring features in the media items (e.g., black out or blur a face, tattoo, etc. or modify, such as beep, a vocal feature), requesting approval of the user making the request to publish the media items (e.g., an image of the user), blocking publication of the media items, or removing publication of the media items. These rules may also be stored in the features database 115, in the memory 209, or other storage medium.

The runtime module 205 can process the media database 113 to determine what media items include the features or combination of features stored in the features database 115 using the feature recognition module 203. The feature recognition module 203 can process features in the features database 115 associated with the user to generate a model to compare against media items to determine whether the media items include the feature(s). The runtime module 205 can retrieve media items from the media database 113. Further, the feature recognition module 203 can determine which media items to check by sorting or filtering media items based on criteria. One such criterion may be associations with a social graph associated with the user. As such, media items associated with users associated with the user's social graph are selected to be processed for the features. In other embodiments, when these particular associated users add media items, the media items are processed. Another criterion can be a location associated with the media item. For example, if the user provides information that the user was at a location (e.g., a party at a bar) at a certain time and the media item matches or matches, at least in part, the location and/or time criteria, the media item can be selected for processing. The feature recognition module 203 then determines whether the media items include the features.

When the media items are determined to include the features, the rule application module 207 can apply rules to the media items. As noted above, the rules can be stored in the features database 115 or a memory 209 of the media privacy platform 111. The rules can be applied to modify or remove the media items from the media database 113. Thus, media items are processed before publication or after publication based on the rules.

Figure 3:
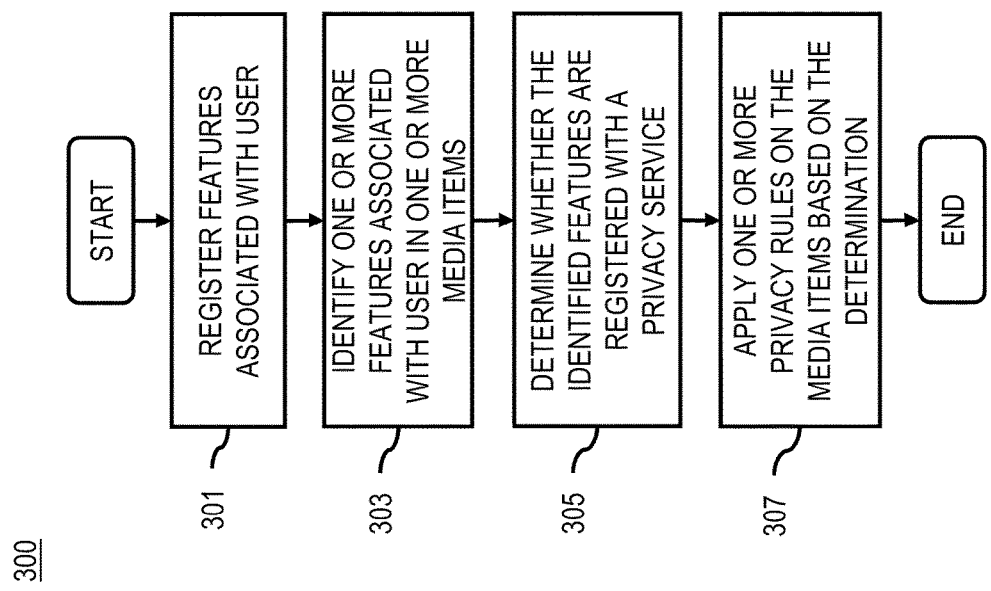
FIG. 3 is a flowchart of a process for preventing unauthorized use of media items, according to one embodiment.

FIG. 3 is a flowchart of a process for preventing unauthorized use of media items, according to one embodiment. In one embodiment, the runtime module 205 of the media privacy platform 111 performs the process 300 and is implemented in, for instance, a chip set including a processor and a memory as shown FIG. 9. As such, the runtime module 205 can provide means for accomplishing various parts of the process 300 as well as means for accomplishing other processes in conjunction with other components of the media privacy platform 111.

In step 301, the runtime module 205 registers features associated with a user. The runtime module 205 can receive a registration request from a user's UE 101. The registration information may include authentication information. Further, the registration information may include media items that may be utilized to extract features. For example, media items may include a set of facial images of the user. A feature recognition module 203 can extract features and landmarks from the facial images to generate a feature model to compare against other media items. In another example, media items may include vocal information that can be utilized to develop a voice recognition model to search for a voice in media items. In yet another embodiment, the features may be associated with objects (e.g., art work, the environment, items associated with the user, etc.). Moreover, the runtime module 205 can provide or receive rules to perform on media items determined to include the features. Further, according to one embodiment, the runtime module 205 receives one or more examples of features from which to extract the features. Further, the runtime module 205 generates a recognition model of the features based, at least in part, on the examples.

Then, at step 303, the runtime module 205 identifies one or more features associated with the user in one or more media items. As noted above, the runtime module 205 can utilize conventional algorithms to determine that the features are present in the media items. For example, a facial recognition algorithm may be utilized to determine if a person's face is present in the media item (e.g., based on the recognition model). Further, other features (e.g., identifying marks such as tattoos or birthmarks) may be utilized to determine that a particular person is in a particular image. In the case of a video media item, each frame may be analyzed to determine if a feature is present. Moreover, in an audio/video media item, segments of audio can be analyzed to determine if a particular vocal pattern associated with a sample is present.

The runtime module 205 determines whether the identified features are registered with a privacy service (e.g., via the media privacy platform 111) (step 305). This determination can be made by associating the identified feature with the user and querying for the feature in the features database 115. In addition, the identified feature can be linked in the features database 115 associating the features with user accounts (e.g., user accounts with the social networking platform 107 and/or the social media platform 109). Further, rules can be linked with the features in the features database 115, so that privacy rules can be specified separately on a feature by feature basis.

At step 307, the runtime module 205 applies one or more privacy rules on the media items based on the determination of whether identified features are registered with the privacy service. As noted above, the rules can be based on obscuring one or more sections of the media item (e.g., blur a recognized face or mark, beep or silence vocal information, etc.) or performing other privacy actions such as allowing the user to approve or deny the media item from being posted or automatically removing the media item from being posted.

For example, if a rule requests that the user is allowed to approve or deny a media item, the media item can be flagged and placed into a temporary memory to await approval by the user. Then, the runtime module 205 can cause, at least in part, transmission of the media item to the user's UE 101 for approval. Further, the user may be provided with the option to allow or deny the publication of the media item. The user may be alerted (e.g., via e-mail, SMS, MMS, social networking messages, etc.) about the publication. Then, the runtime module 205 receives a communication associated with the user's response. If the media item is approved, the media item is published or republished. Further, other options may be provided to the user (e.g., an option to obscure one or more portions of the media item). Moreover, a default rule may be applied if the user does not respond (e.g., a default rule to automatically deny posting). In another embodiment, the runtime module 205 can request additional information from a UE 101 to confirm that the feature is present in the media item. Thus, the runtime module 205 could request more information about the feature(s) such as additional facial images of user, information about user's contextual data (e.g., the user's location at a certain time, environmental information about the user's location including what objects or features (e.g., other people) were nearby the user at the time, etc.), or the like.

Figure 4:
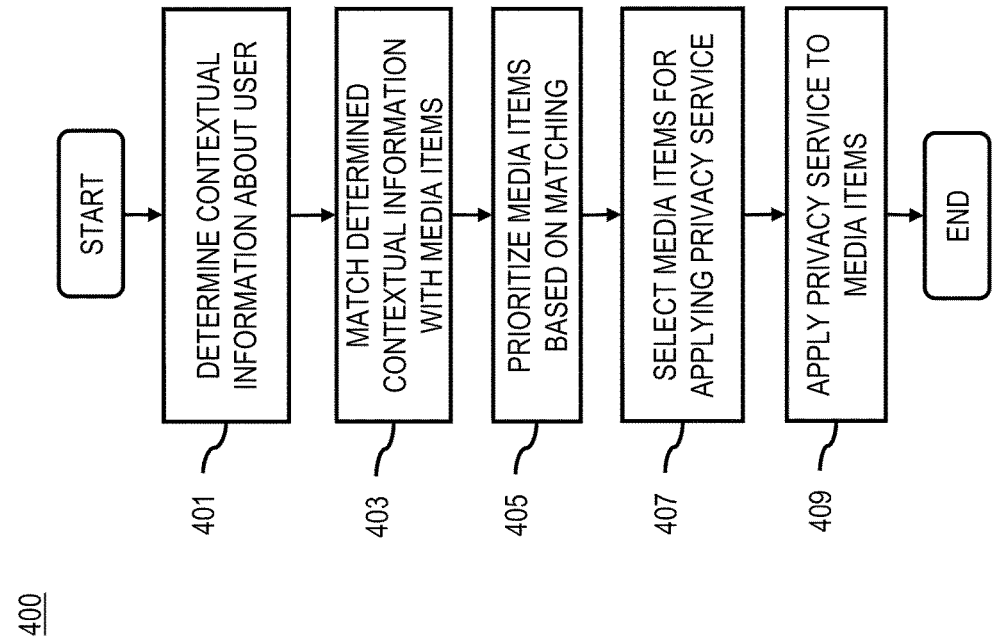
FIG. 4 is a flowchart of a process for selecting media items for applying a privacy service, according to one embodiment.

FIG. 4 is a flowchart of a process for selecting media items for applying a privacy service, according to one embodiment. In one embodiment, the runtime module 205 of the media privacy platform 111 performs the process 400 and is implemented in, for instance, a chip set including a processor and a memory as shown FIG. 9. As such, the runtime module 205 can provide means for accomplishing various parts of the process 400 as well as means for accomplishing other processes in conjunction with other components of the media privacy platform 111.

At step 401, the runtime module 205 determines contextual information associated with a user. As mentioned above, the user may register with the media privacy platform 111. As such, contextual information can be entered at a UE 101 of the user and received at a communication interface 201 of the media privacy platform 111. This contextual information may be linked with one or more features associated with the user, the features themselves, the media items, other related users, etc. In certain embodiments, the contextual information includes information about locations of the user that the user has been. In another embodiment, the contextual information includes timing information as to when the media items were captured or other information about the media item (e.g., an identifier of a person capturing the media item). In yet another embodiment, contextual information may be determined from the features. For example, if the feature includes a landmark (e.g., the Eiffel Tower) or other information associating the feature with a location, contextual information may be utilized to determine that the media item would be associated with a location of the feature (e.g., France).

Then, at step 403, the runtime module 205 matches or matches, at least in part, the determined context information against metadata associated with the media items. The media items can include the metadata with contextual tags. These tags can include location information (e.g., location coordinates or a name of a location) as well as time information, information associated with a capturer of the media item, equipment information associated with equipment (e.g., a camera model, camera settings, etc.) used to capture the media item, etc. In certain embodiments, any portion of the metadata may be associated with contextual information and can thus be utilized for matching or matching, at least in part. Media items are then prioritized based on the matching or matching, at least in part, (step 405). The prioritization allows for the runtime module 205 to select media items to process for identifying features. This provides for the saving of processing of media items based on the prioritization. Further, in certain embodiments, the prioritization removes media items from being candidates to select for identifying features. Then, at step 407, the runtime module 205 selects media items for applying the media privacy service. As such, the process 300 of FIG. 3 is applied on the selected media items (step 409). Further, as noted above, the contextual information may be utilized to specify search algorithms for features. For example, the contextual information can be used to perform a more exhaustive search for features in media items with metadata that match or match, at least in part, the contextual information.

Figure 5:
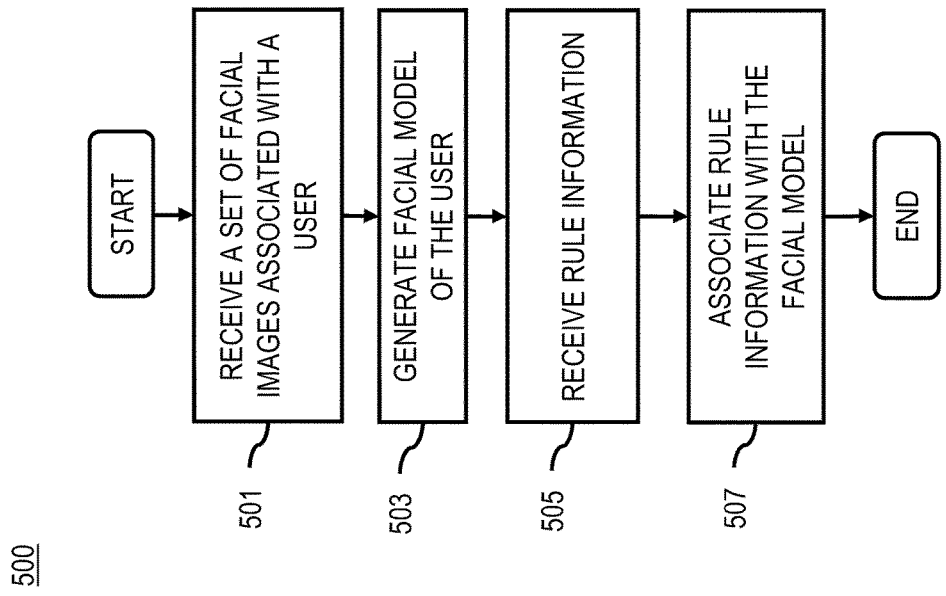
FIG. 5 is a flowchart of a process for generating a facial model for selecting images to process using privacy rules, according to one embodiment.

FIG. 5 is a flowchart of a process for generating a facial model for selecting images to process using privacy rules, according to one embodiment. In one embodiment, the runtime module 205 of the media privacy platform 111 performs the process 500 and is implemented in, for instance, a chip set including a processor and a memory as shown FIG. 9. As such, the runtime module 205 can provide means for accomplishing various parts of the process 500 as well as means for accomplishing other processes in conjunction with other components of the media privacy platform 111.

At step 501, the runtime module 205 receives a set of facial images associated with a user. As noted above, the user may be registered with the media privacy platform 111 (e.g., via being registered with another platform). In this embodiment, the facial images can be of the user. Further, multiple sets of facial images can be received. In other embodiments, the user can utilize the service as a guest. The set of facial images are then associated with the registered or guest account. Then, at step 503, the runtime module 205 causes, at least in part, the feature recognition module 203 to generate a facial model of the user. In certain examples, the facial model includes landmarks or features such as the position, size, and/or shape of eyes, nose, cheekbones, jaw, etc.

At step 505, the runtime module 205 receives rule information. The rule information includes privacy rules that can be associated with the one or more set of facial images as well as recognition rules that may provide for determination of combinations of features to select from a media item. As such, recognition rules can be applied for determining what to do if features are identified. For example, a rule can be utilized to determine whether the user and another identified feature are included in a media item. In this example, the user's face, the user's ex-girlfriend's face, a bottle of beer, a bar (e.g., contextual features), etc. can be features to be identified. Thus, if the user and the user's ex-girlfriend are identified in a media item, certain privacy rules can be invoked. As such, the runtime module 505 can associate privacy rule information with the facial model (step 507). The privacy rule information may additionally include rules for performing actions on media items. As noted above, the privacy rules may include obscuring of images of media items, provide restrictions on media items such as removing media items or requesting permission for publishing media items, etc. Further, the user can define different recognition and/or privacy rules that can be applied separately or at the same time. Rules can be based on, for example, on Boolean operations. Moreover, rules can combine multiple rules. In one example, a privacy rule can be invoked on a media item if a recognition rule is met. The recognition rule may include a determination that the user's face and an ex-girlfriend of the user's face is present in the media item and the user is in a compromising position (e.g., nude).

Figure 6:
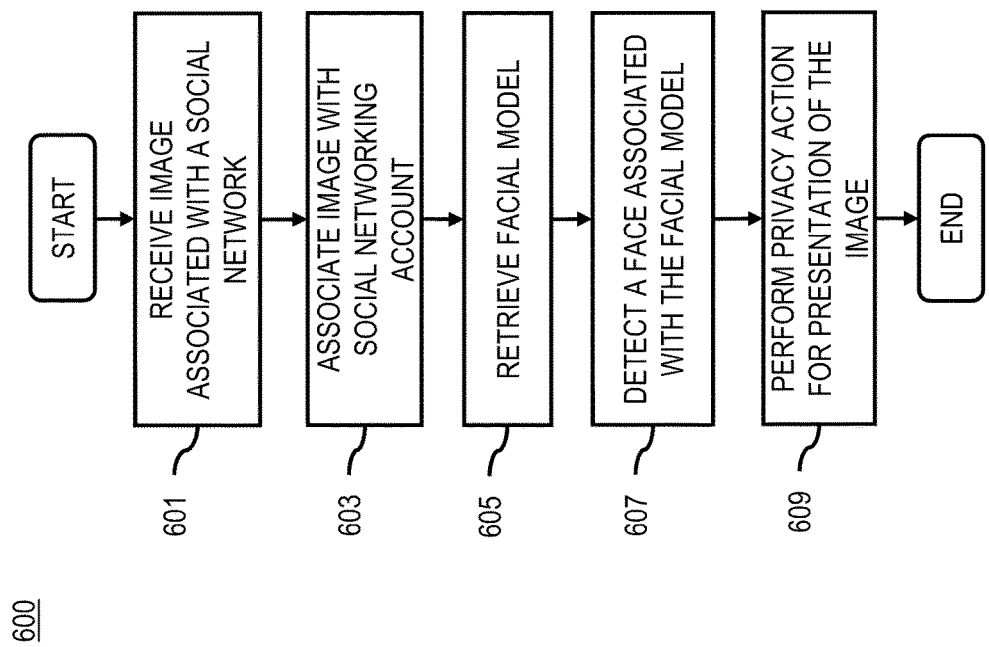
FIG. 6 is a flowchart of a process for processing images using privacy rules, according to one embodiment.

FIG. 6 is a flowchart of a process for processing images using privacy rules, according to one embodiment. In one embodiment, the runtime module 205 of the media privacy platform 111 performs the process 600 and is implemented in, for instance, a chip set including a processor and a memory as shown FIG. 9. As such, the runtime module 205 can provide means for accomplishing various parts of the process 600 as well as means for accomplishing other processes in conjunction with other components of the media privacy platform 111.

At step 601, the runtime module 205 receives an image associated with a social network. The image can be received based on a new image being uploaded by a member of the social network or via a request. The image is then associated with a social networking account (step 603). The social networking account may be an account associated (e.g., marked as a friend in a social graph) with a user registered with a privacy service (e.g., the user that initiates the request). The user's registration may be associated with privacy rules and feature recognition models. As such, the runtime module 205 can retrieve a facial model from a features database 115 (step 605). The facial model can be generated utilizing the processes 500 of FIG. 5. The runtime module 205 then detects a face associated with the facial model in the received image (step 607). The detected face can be utilized to determine a privacy action. For example, if the face is detected, the user can set up rules (e.g., via the UE 101) to perform one or more privacy actions (step 609). Then, the runtime module 205 performs the privacy action according to the privacy rules for presentation of the image.

It is contemplated that an analogous process can be used to identify any other type of feature (e.g., voice using voice recognition, objects using object recognition, etc.). Moreover, when multiple feature types (e.g., face and object) are selected for identification, multiple recognition models can be created to facilitate the identification of the features in the media items.

Figure 7A:
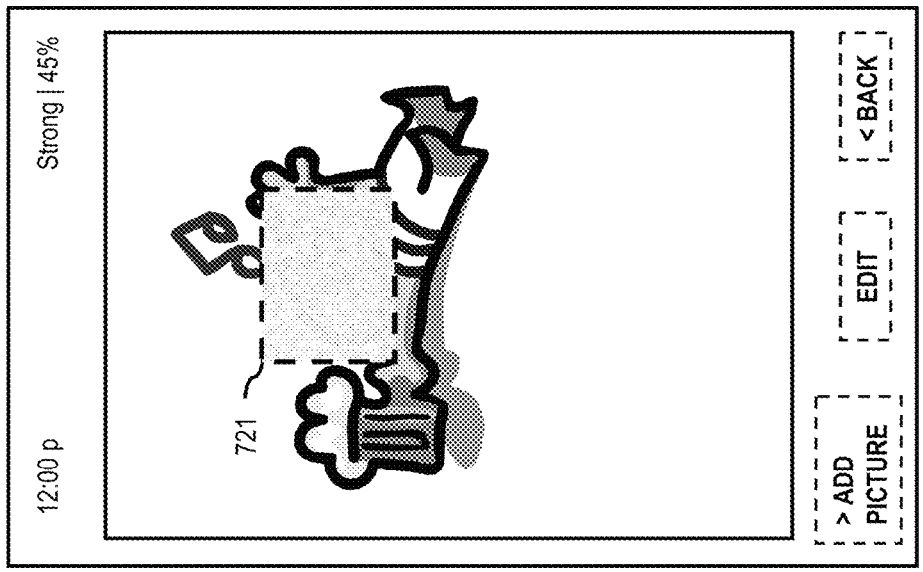
FIGS. 7A-7C are diagrams of user interfaces utilized in the processes of FIG. 3-6, according to various embodiments.
Figure 7B:
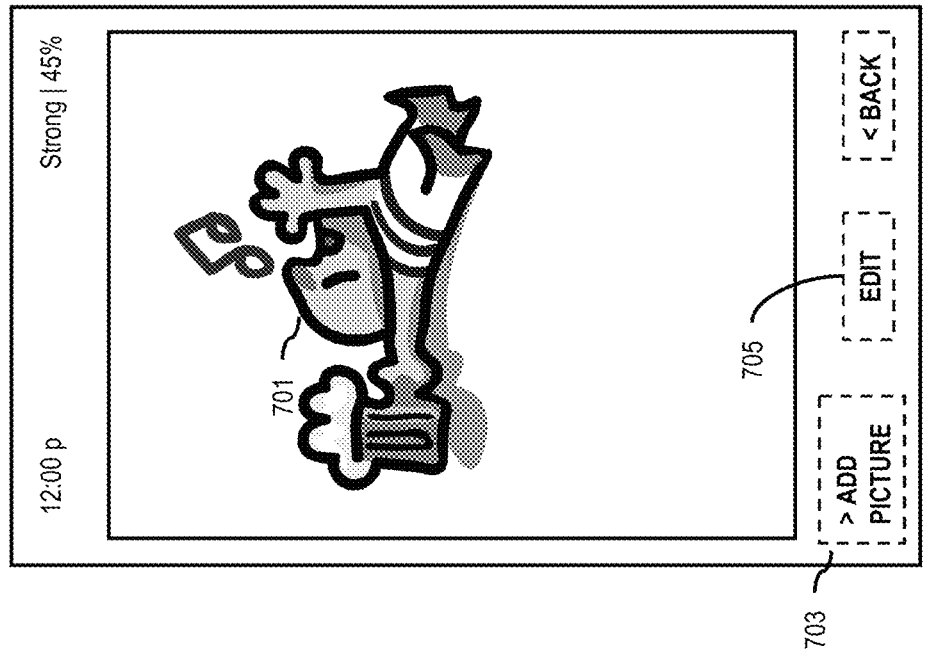
Figure 7C:
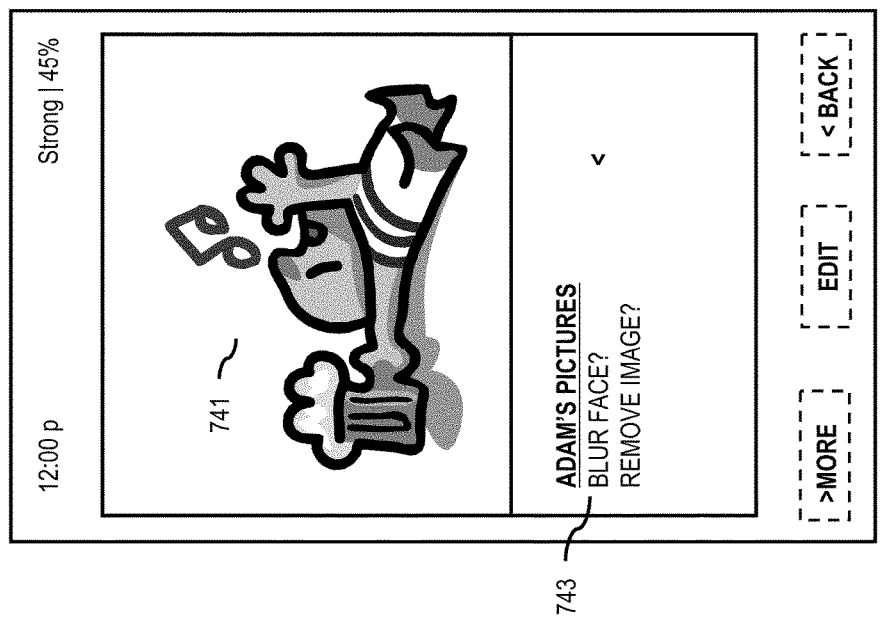

FIGS. 7A-7C are diagrams of user interfaces utilized in the processes of FIG. 3-6, according to various embodiments. In user interface 700, a user uploads an image 701 to a social networking platform 107. The person in the image 701 may be performing an action that the person does not want published to other people. For example the image 701 is of a person that is visibly drunk. Further, the user is provided the option to add the image 703 or edit the image 705. When the social networking platform 107 receives the image, the image can be forwarded to the media privacy platform 111. Further, the person in the image may set up rules associated with images of the person. As such, user interface 720 presents modifications (e.g., a blurring of facial features) to the image 721 based on a set of rules. In this embodiment, the rules may automatically blur the image 721 or allow the person to choose to blur the image 721.

User interface 740 presents the image 741 presented to the person according to a particular rule. In certain embodiments, the rule may cause the media privacy platform 111 to initiate a prompting on the person's UE 101 to ask the person to perform an action 743 according to the rule. Thus, the user may be provided options to blur the face in the image 741 or remove the image from publication on the social networking platform 107. The person may set up the rules by providing the media privacy platform 111 a set of images of the person's face and associating one or more rules with the images.

With the above approaches, the unauthorized use of media content can be prevented by a user. Moreover, because social networking graphs and/or context information may be utilized to filter which media items are searched for features of the user, processing efficiency is gained by the media privacy platform 111. Further, because the user may register with the media privacy platform 111 to provide the media privacy platform 111 with features to recognize and associated privacy rules to apply, the user need not manually scan media items to request that privacy be afforded to the user. As such, the user can save valuable processing power on the user's UE 101 as well as personal time.

The processes described herein for preventing unauthorized use of media content may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
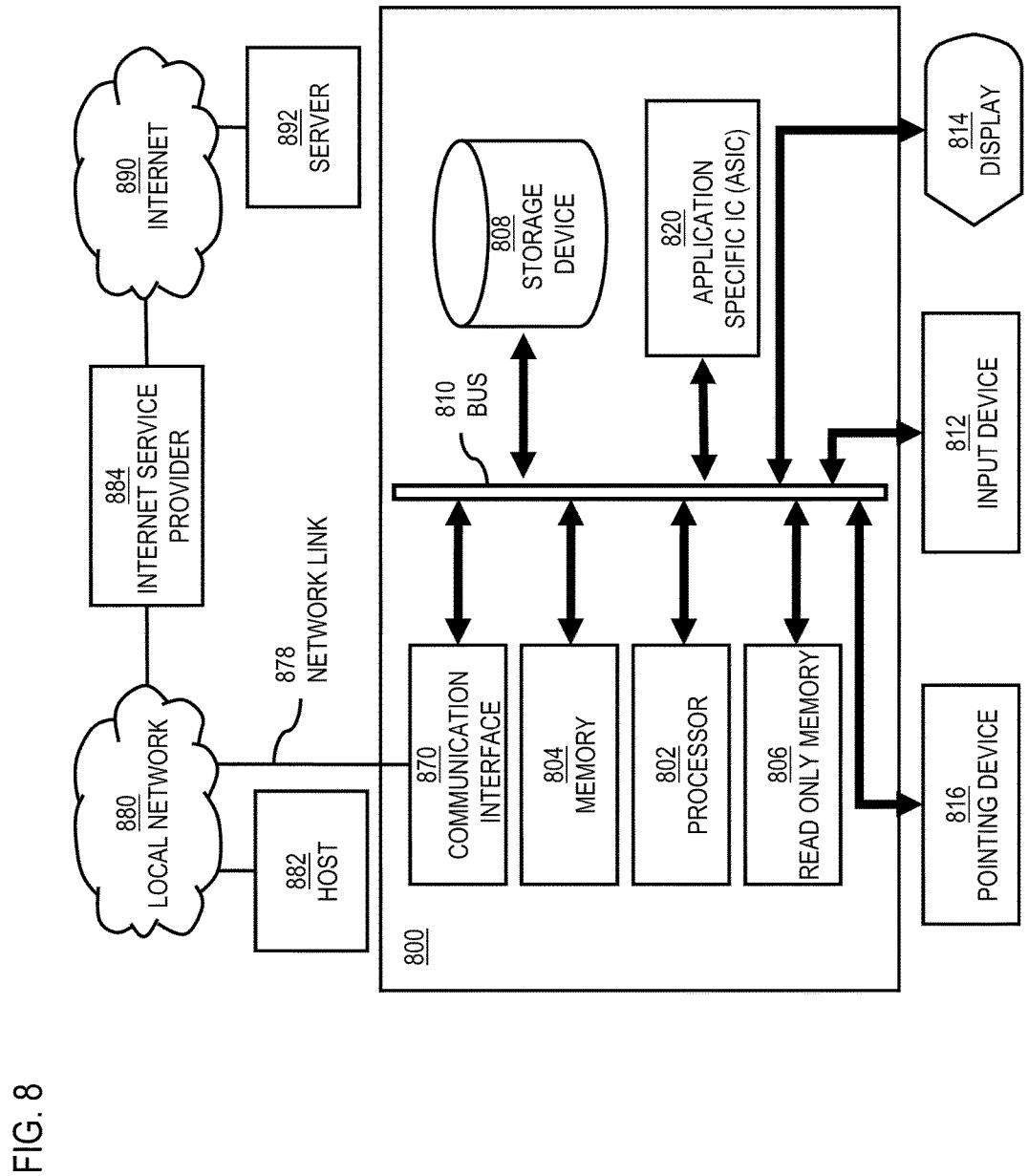
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to prevent unauthorized use of media content as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of preventing unauthorized use of media content.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to preventing unauthorized use of media content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for preventing unauthorized use of media content. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for preventing unauthorized use of media content, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
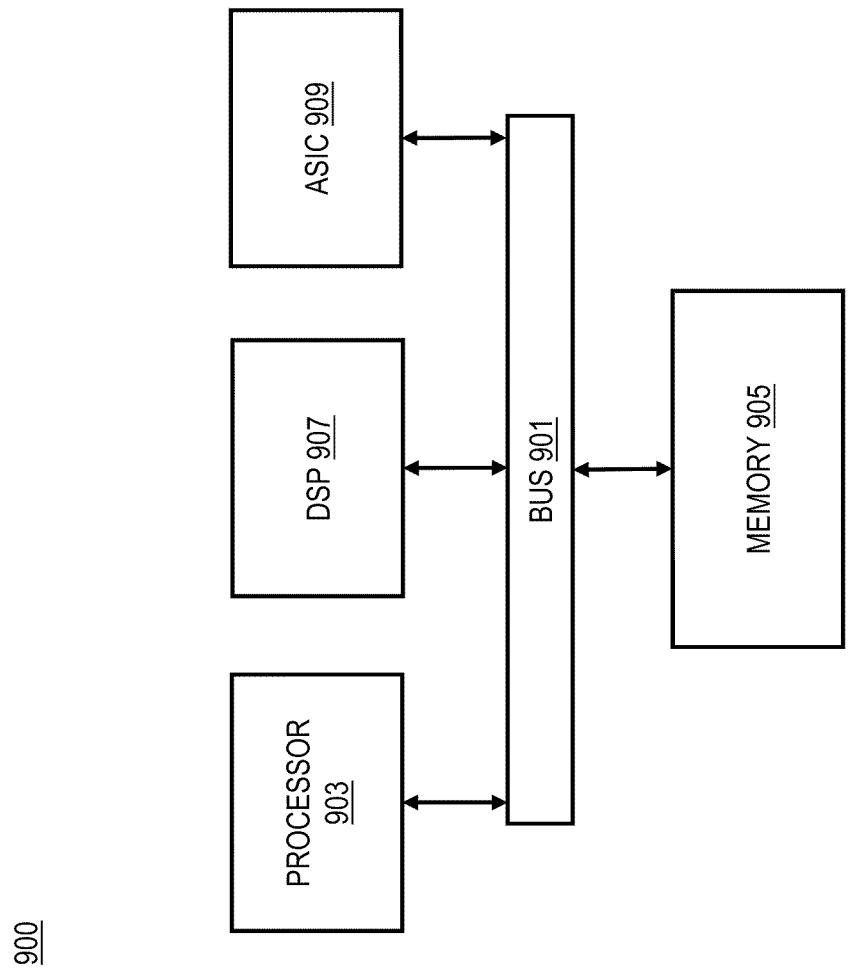
FIG. 9 is a diagram of a chip set that can be used to implement an embodiment of the invention.

FIG. 9 illustrates a chip set or chip 900 upon which an embodiment of the invention may be implemented. Chip set 900 is programmed to preventing unauthorized use of media content as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip *\00 can be implemented as a single "system on a chip." It is further contemplated that in certain embodiments a separate ASIC would not be used, for example, and that all relevant functions as disclosed herein would be performed by a processor or processors. Chip set or chip *\00, or a portion thereof, constitutes a means for performing one or more steps of providing user interface navigation information associated with the availability of services. Chip set or chip 900, or a portion thereof, constitutes a means for performing one or more steps of preventing unauthorized use of media content.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to prevent unauthorized use of media content. The memory 905 also stores the data associated with or generated by the execution of the inventive steps.

Figure 10:
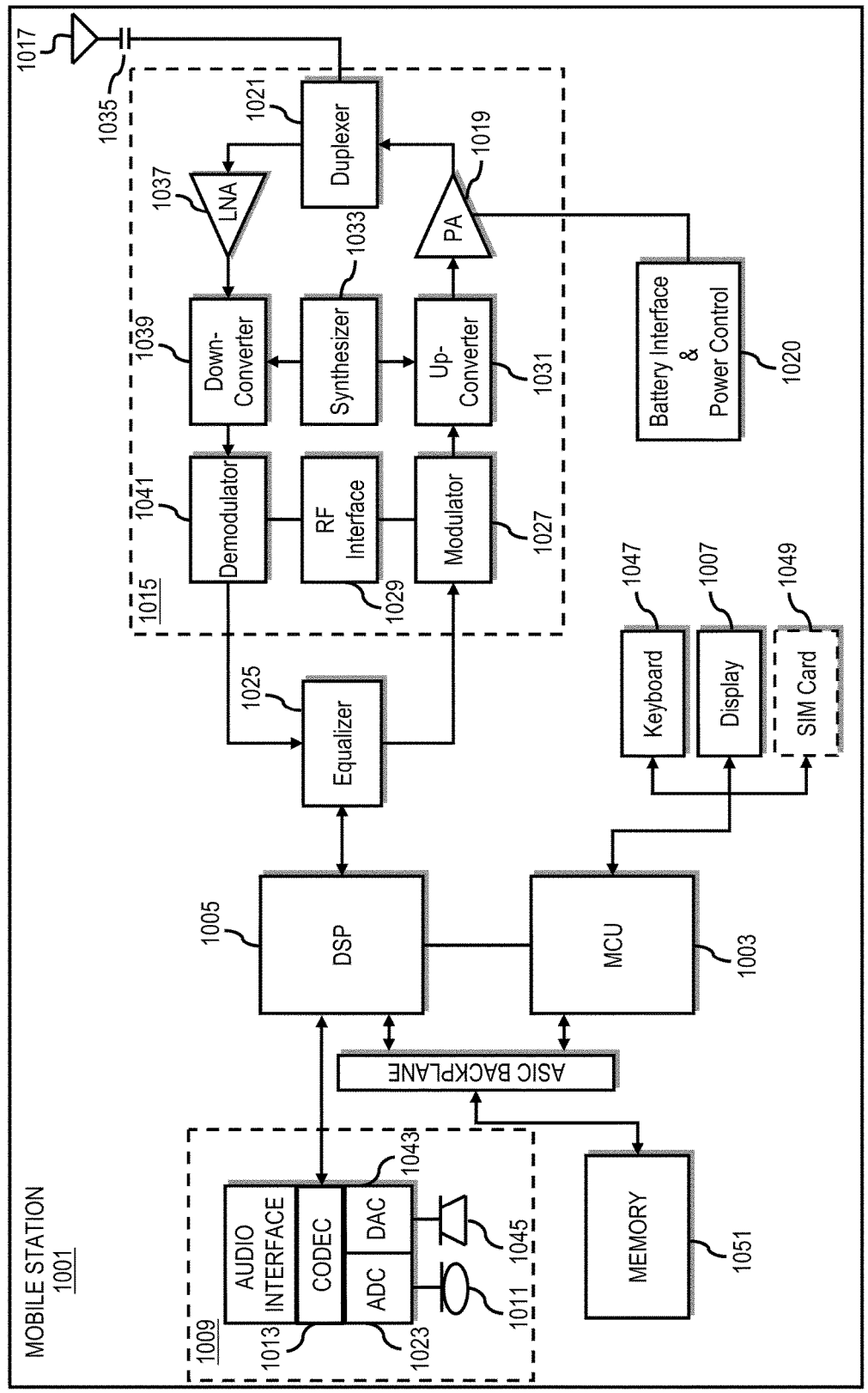
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of preventing unauthorized use of media content by setting rules for media items and providing features to associate with media items. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of preventing unauthorized use of media content. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match or match, at least in part, impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to prevent unauthorized use of media content. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  determining context information associated with a user of a privacy service, the context information including at least one of date, time, and location, and being linked with one or more features associated with two or more media items associated with the user of the privacy service;
  matching with one or more processors, at least in part, the determined context information against metadata associated with the two or more media items to obtain a prioritized set of the two or more media items;

searching the prioritized set of the two or more media items to identify the one or more features associated with the user of the privacy service;
determining with the one or more processors whether the identified one or more features are registered with the privacy service; and
based on a result of the step of determining, applying with the one or more processors one or more privacy rules on each media item of the prioritized set of the two or more media items in which the one or more features is identified.

2. A method of claim 1, wherein the registering of the features with the privacy service comprises:
receiving one or more examples of the features; and
generating a recognition model of the features based, at least in part, on the examples.

3. A method of claim 2, wherein the identifying of the features is based, at least in part, on the recognition model.

4. A method of claim 2, wherein the recognition model is a facial recognition model.

5. A method of claim 1, further comprising:
detecting a request to publish the media items,
wherein the application of the privacy rules is performed prior to publication of the media items.

6. A method of claim 1, wherein the privacy rules invoke actions including obscuring of the features in the media items, requesting prior approval to publish the media items, blocking publication of the media items, removing publication of the media items, or combination thereof.

7. A method of claim 1, wherein the features include features of a user of the privacy service, features of one or more other users, features of an environment, or combination thereof.

8. A method of claim 1, wherein the media items are associated with a social networking site, a media sharing site, or combination thereof.

9. An apparatus comprising:
at least one processor; and
at least one memory including computer program code,
the at least one memory and the computer program code configured to, with the at least one processor, cause the apparatus to perform at least the following,
determine context information associated with a user of a privacy service, the context information including at least one of date, time, and location, and being linked with one or more features associated with two or more media items associated with the user of the privacy service;
match, at least in part, the determined context information against metadata associated with the two or more media items to obtain a prioritized set of the two or more media items;
search the prioritized set of the two or more media items to identify the one or more features associated with the user of the privacy service;
determine whether the identified one or more features are registered with the privacy service; and
based on a result of step of the determination, apply one or more privacy rules on each media item of the prioritized set of the two or more media items in which the one or more features is identified.

10. An apparatus of claim 9, wherein the registering of the features with the privacy service comprises causing the apparatus, at least in part, to:
receive one or more examples of the features; and
generate a recognition model of the features based, at least in part, on the examples.

11. An apparatus of claim 10, wherein the identifying of the features is based, at least in part, on the recognition model.

12. An apparatus of claim 10, wherein the recognition model is a facial recognition model.

13. An apparatus of claim 9, wherein the apparatus is further caused, at least in part, to:
detect a request to publish the media items,
wherein the application of the privacy rules is performed prior to publication of the media items.

14. An apparatus of claim 9, wherein the privacy rules invoke actions including obscuring of the features in the media items, requesting prior approval to publish the media items, blocking publication of the media items, removing publication of the media items, or combination thereof.

15. An apparatus of claim 9, wherein the features include features of a user of the privacy service, features of one or more other users, features of an environment, or combination thereof.

16. An apparatus of claim 9, wherein the media items are associated with a social networking site, a media sharing site, or combination thereof.

17. A non-transitory computer-readable storage medium carrying one or more sequences of one or more instructions which, when executed by one or more processors, cause an apparatus to at least perform the following steps:
determining context information associated with a user of a privacy service, the context information including at least one of date, time, and location, and being linked with one or more features associated with two or more media items associated with the user of the privacy service;
matching, at least in part, the determined context information against metadata associated with the two or more media items to obtain a prioritized set of the two or more media items;
searching the prioritized set of the two or more media items to identify the one or more features associated with the user of the privacy service;
determining whether the identified one or more features are registered with the privacy service; and
based on a result of the step of determining, applying one or more privacy rules on each media item of the prioritized set of the two or more media items in which the one or more features is identified.

18. A non-transitory computer-readable storage medium of claim 17, wherein the registering of the features with the privacy service comprises:
receiving one or more examples of the features; and
generating a recognition model of the features based, at least in part, on the examples.

* * * * *